United States Patent [19]

Groult, deceased et al.

[11] Patent Number: 5,389,424

[45] Date of Patent: Feb. 14, 1995

[54] ANTIABRASION CURVED SHAPE AND PROCESS FOR ITS MANUFACTURE

[75] Inventors: Pierre Groult, deceased, late of Villeconin; Josette Groult, heir; Groult, heir, Therese; Maria S. Groult, heir; Vanina Groult, heir; Henri Groult, heir; Barthelemy Groult, heir, all of Villeconin; Michel Huvey, heir, Bougival, all of France

[73] Assignee: Institut Francais Du Petrole, Rueil-Malmaison, France

[21] Appl. No.: 773,412

[22] Filed: Oct. 9, 1991

Related U.S. Application Data

[63] Continuation of Ser. No. 144,915, Mar. 3, 1988, abandoned.

[30] Foreign Application Priority Data

Apr. 8, 1986 [FR] France ................ 05.096/86

[51] Int. Cl.⁶ ................... B32B 1/00; B29C 45/00
[52] U.S. Cl. ................... 428/174; 428/142; 428/192; 428/365; 428/369; 428/376; 428/398; 428/908.8; 264/130; 264/159; 264/295; 264/255; 264/257; 264/510; 264/512; 264/563; 138/129

[58] Field of Search ............ 428/192, 174, 409, 474.4, 428/458, 908.8, 377, 141, 142, 188, 357, 365, 369, 376, 398, 400; 264/510, 512, 563, 255, 257, DIG. 26, 264, 130, 159, 295; 138/122, 129, 137, 172, 174; 156/187

[56] References Cited

FOREIGN PATENT DOCUMENTS 2088320 6/1982 United Kingdom .

Primary Examiner—Donald J. Loney
Attorney, Agent, or Firm—Antonelli, Terry, Stout & Kraus

[57] ABSTRACT

Antiabrasion curved section made of reinforced curved plastic material and comprising in at least one of a lower portion and an upper portion in antiabrasion material. A plurality of antiabrasion sections are produced inside a profiled mold having a plurality of grooves in which is arranged the antiabrasion material of the lower faces. Reinforced filaments impregnated with a stabilizable resin are supplied to the mold and, finally, the antiabrasion material of the upper faces is applied. The mold is wound on a mandrel and the plastic material is stabilized before removing the mold sections which form a unitary assembly dividable particulary during the stranding of arm rings.

11 Claims, 3 Drawing Sheets

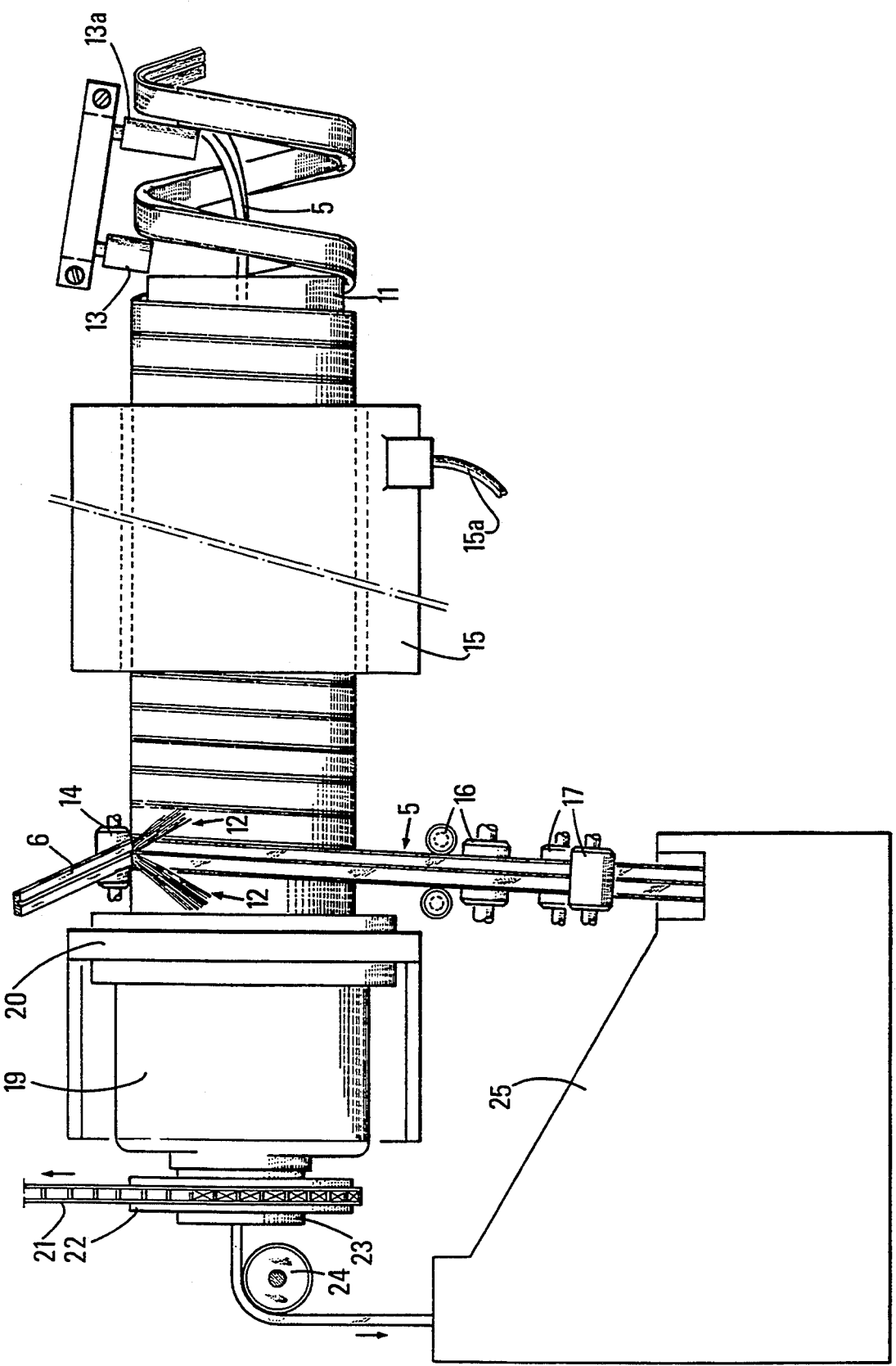

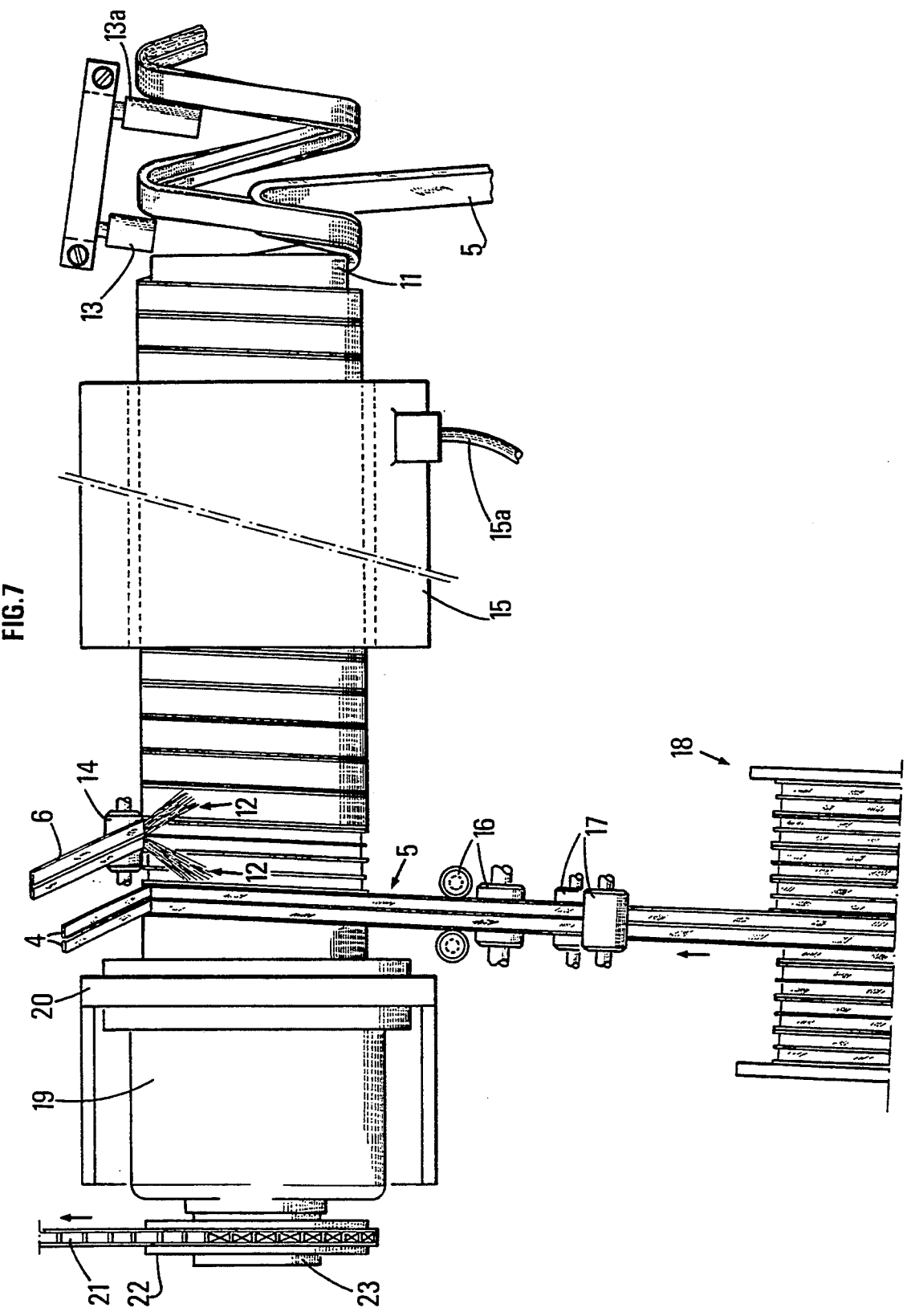

ANTIABRASION CURVED SHAPE AND PROCESS FOR ITS MANUFACTURE

This is a continuation of application Ser. No. 144,915, filed Mar. 3, 1998, now abandoned.

BACKGROUND OF THE INVENTION

The present invention relates to an elongated body made of reinforced plastic capable of resisting abrasion, and a process for its manufacture.

Such shaped bodies are usable, particularly but not exclusively, to manufacture highly resistant lightweight tubing by helical winding of the shapes. Tubes of this kind assembled in this fashion are described, for example, in U.S. Pat. No. 4,013,100.

It has already been proposed, for example, in French Patent 2,312,356 to make a shape of reinforced plastic by using a mixture of filaments and cross-linkable plastic to fill an elongated groove forming a mold, wound on the wall of a drum, with the shape being extracted from this groove after heat treatment.

During tests of bending fatigue of elements manufactured with shapes of this type, significant abrasion of the several layers thus formed has been observed, with the abrasion being capable of leading to premature failure of the tube.

French Patent 2,494,401 has already proposed a body of an elongated shape of reinforced plastic capable of resisting abrasion on at least three of its surfaces, and a process for manufacturing the elongated shaped body. However, the proposed shape is quite expensive, first because of the antiabrasion materials which it uses (quantity X unit price) and also because of the manufacturing cost. The latter increases as the width of the shapes decreases (dimension of the cross section of the shape along a perpendicular to the radius, with the height being the dimension along the radius) because the output of covering surface (composed of shapes) by the production machinery becomes smaller by the same proportion (covering surface output=rate of output of length multiplied by width of shape).

The present invention proposes a shape which is resistant to abrasion and a process for manufacturing the latter which overcomes the disadvantages of French Patent 2,494,401 cited above.

During fatigue testing of flexible tubing comprising several reinforcing sheets, it has been found that wear is irregularly distributed over the surfaces in question of the shape and that in all types of tubes and service configurations observed, the wear on the lower surfaces (internal surface of the shape) and upper surfaces (outer surface of the shape) is extremely severe and poses a serious danger to the tubing, while the wear on the side surfaces has no serious effects in the very long term.

The wear on the lower and upper surfaces corresponds to the contact zones where the effect of a high sliding speed is added to that of a high degree of friction, linked to a high contact force between the upper surfaces of the shaped bodies of a first sheet and the lower surfaces of the shaped bodies of a second sheet in contact with the first sheet at the surfaces.

To overcome this damage to the surfaces, a suitably selected antiabrasion material can be placed between them and also, for reasons of stability of the latter, it can easily be rendered integral with one or the other of the surfaces. Thus, by using only a single layer of antiabrasion material, the quantity of the antiabrasion material is reduced to a minimum and because of its high cost, the maximum reduction is achieved in the cost of abrasion-resistant shaped bodies.

According to an especially economical manufacturing process, the present invention proposes to create abrasion-resistant shapes by making the antiabrasion material integral with the upper surfaces of the shaped bodies and simultaneously producing several shapes.

The present invention, in addition to the economic advantages which it confers, makes it possible to facilitate the installation of shaped bodies when winding reinforced tubing and cables, particularly those which comprise a large number of shaped bodies per reinforcing sheet.

In addition to the same advantages as outlined above, the present invention also offers the possibility of manufacturing shaped bodies which comprise an antiabrasion material which is on both the lower surface and the upper surface.

By virtue of the process of the present invention it is possible, especially for tubing comprising three superimposed sheets of shapes, to limit the number of abrasion-resistant shapes. By using shapes to form the central sheet which are resistant to abrasion on both their lower and upper surfaces, it is sometimes useless to use abrasion-resistant shapes to produce the extreme sheets.

In accordance with the process for manufacturing according to the invention, an elongated body of reinforced material capable of resisting abrasion and comprising a lower and an upper surface is provided with the process utilizing an elongated groove forming a mold which is filled with the reinforced material, and before the groove is filled with the reinforced material, a first layer of antiabrasion material is placed on the bottom and/or walls of the groove and/or after having lined the groove with the reinforced material, it is covered with a second layer of antiabrasion material. After having carried out one and/or the other of the preceding steps, the groove is separated from the reinforced material comprising the layer or layers of antiabrasion material.

When the reinforced material is a mixture of stabilizable plastic and high-resistance filaments, the first layer of antiabrasion material can be applied before proceeding to the treatment that permits the shape of the stabilizable material to be stabilized.

To manufacture curved elongated bodies using a hollow shaped mold, the elongated bodies could be shaped in the hollow shape arranged in a helix on a mandrel, and after forming the elongated body comprising the layer or layers of antiabrasion material, they could be separated from the hollow shape.

The mold could comprise several essentially parallel grooves, making it possible to produce several abrasion-resistant bodies simultaneously.

The layer or layers of antiabrasion material could be in the form of a strip.

All the upper surfaces of the elongated bodies could be covered simultaneously to protect them against abrasion, using a single strip of antiabrasion material.

The strip could include a restriction zone between each elongated body.

After having separated the shape which forms the mold for the shaped elongated bodies covered by the antiabrasion strip, the strip could be divided longitudinally between the elongated bodies to produce simultaneously several shaped elongated abrasion-resistant bodies.

The shaped bodies could be separated from one another during the use of the reinforced body, with the reinforced body comprising the shaped bodies.

The invention also provides a shaped body obtained by working the process.

The invention also provides a curved elongated abrasion-resistant body, specifically characterized by the fact that the upper surface and/or the lower surface of the elongated body is/are resistant to abrasion and by the fact that one part at most of the lateral surfaces of the body is resistant to abrasion.

The internal walls of the mold could be lined with an antiadhesive product before adding the filaments of cross-linkable material.

The elongated body could comprise an antiabrasion material only on its upper surface and/or lower surface.

The invention also provides for a strip having at least one surface and grouping the parallel elongated bodies with the bodies having to be used simultaneously. This strip is characterized by each of the elongated bodies comprising a surface which is integral with a part of the surface of the strip and characterized by the fact that in the course of the utilization of the elongated bodies, with the strip being designed so that the elongated bodies acquire a relative freedom of movement between them.

BRIEF DESCRIPTION OF THE DRAWINGS

The invention is illustrated by the attached drawings wherein:

FIG. 6 is a schematic view of an apparatus according to the invention for manufacturing shaped bodies and recycling the shaped mold;

FIG. 7 is a schematic diagram of another apparatus according to the invention for manufacturing shapes that are resistant to abrasion on their lower and upper surfaces;

DETAILED DESCRIPTION

Figure 1:
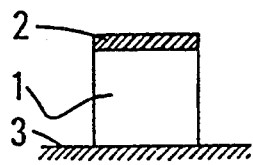
FIG. 1 is a cross section through a shape according to the invention with an antiabrasive protection on its upper surface and resting on a reinforcing sheet inside a reinforced pipe.

In FIG. 1, a shaped body 1 is covered on its upper surface by a layer of an antiabrasion material 2, with the shaped body 1 resting in service on a part 3 which can be either a reinforcing armature of an internal sheet or a sealing lining for a flexible pipe.

Figure 2:
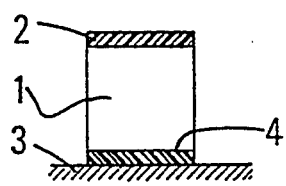
FIG. 2 is a cross-sectional view of a shape according to the invention comprising an antiabrasion protection on its lower and upper surfaces.

As shown in FIG. 2, the shaped body 1 can comprise not only protection for its upper surface, provided by a layer 2 of an antiabrasion material which protects both the shape itself and possibly the shapes of the upper reinforcing sheet, but also protection against abrasion of its lower surface with the aid of a further layer of an antiabrasion material which, as in the case of the upper surface, simultaneously protects the shape and possibly the shapes of the internal reinforcing sheet.

Figure 3:
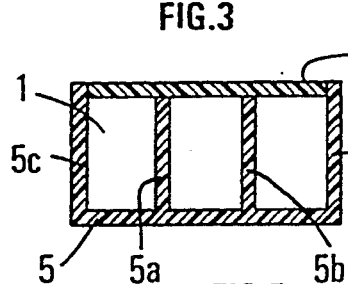
FIG. 3 is a cross-sectional view of a shaping mold according to the invention during the production of shapes resistant to abrasion on their upper parts.
Figure 4:
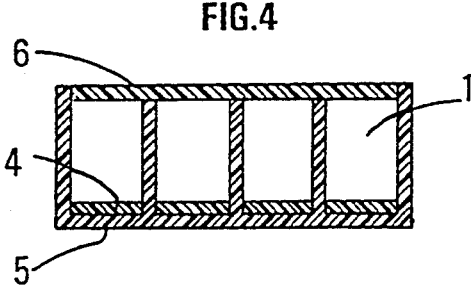
FIG. 4 is a cross-sectional view of a shaping mold according to the invention during the manufacture of shapes resistant to abrasion on their lower and upper surfaces.
Figure 5:
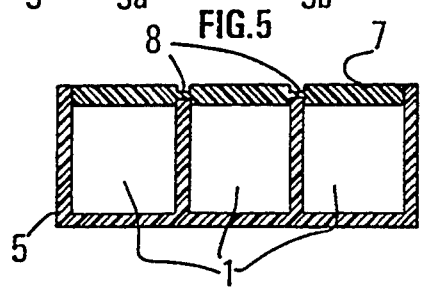
FIG. 5 is a cross-sectional view of a detail of the molding of the shapes connected by an antiabrasion strip comprising restriction zones between each shaped body.

While FIGS. 1 and 2 show the shaped body equipped with its antiabrasive protection or protections after manufacture, FIGS. 3, 4 and 5 show various embodiments of these shapes according to the invention.

According to the invention, several abrasion-resistant shaped bodies are produced simultaneously in a multi-groove shaped mold 5 which can be made, for example, of polyamide 11 generally known by the trademark RISLAN.

In FIG. 3, the antiabrasion material consists of a strip 6 of antiabrasion material which can be a plastic embedded in external walls 5C and 5D of the mold 5 up to the level of its internal walls 5A and 5B and which simultaneously covers all the shapes.

The ends of the exterior vertical walls of the mold 5 or the external walls 5C, 5D are designed here to facilitate centering the strip in the mold 5.

The strip 6 is designed to become integral with each of the shaped bodies and not to stick to the mold 5. This integration can be accomplished by sticking or mechanical anchoring.

On the other hand, the mold 5 is designed to facilitate removing shaped bodies 1, connected together by the strip 6, from the mold 5.

For this purpose, the grooves in the mold 5 could be lined with antiadhesion products such as a mold removal agent of a type currently used in the plastics industry before lining these grooves with filaments and a stabilizable plastic.

The term stabilizable material refers to the bodies which can assume a stable form by a physical or chemical process such as melting with cooling or cross-linking. These materials can be thermoplastic, thermosetting, or elastomeric, for example.

It is also possible to use as a mold removal agent sheets of antiadhesion plastic at least on one of their surfaces and placed inside the mold 5.

On the bottom of each of the grooves in the mold 5 there is an antiabrasion material 4 which will constitute the anti-wear protection for the bottom surface of the shaped bodies 1. In each groove the antiabrasion material is covered with reinforcing filaments impregnated with resin using means adapted for integrating the antiabrasion material. The upper surface of each of the shaped bodies 1 is then covered with a strip 6 of antiabrasion material which adheres to the upper surfaces.

FIG. 4 shows the arrangement in a mold of different materials when making shaped bodies 1 resistant to abrasion on both their lower and upper surfaces.

FIG. 5 shows a preferred embodiment in which an antiabrasion strip 7 of adjustable thickness is used, comprising free restrictions 8 located above the internal walls of the mold 5. This strip 7 is made integral with shaped bodies 1 as described above. The free restrictions 8 extend in the direction of elongation of the strip 7 made of antiabrasion material.

Essentially the goal of these restrictions is to enable the strip 7 to cover all of the mold shapes as well as to enable all of the shapes, once removed from the mold, to constitute a unit assembly which can be easily stored and handled.

Furthermore, the restrictions 8 facilitates a carrying out of a separation of the shaped bodies 1 either at the time of winding or during the service life of the tubing, cable or reinforced body without thereby producing any harmful effects such as disintegration of the reinforcing sheet used, for example, in the reinforced tubing and cables and harming the arrangement of the reinforcing sheets.

The thickness of the strip 7 at the level of the free restrictions 8 can thus be very small (several hundredths of a millimeter, for example). The material at the level of the free restrictions 8 can be either the antiabrasion material itself or another material.

As shown in FIGS. 6 and 7, the multigroove mold 5 used to manufacture shaped bodies and for adding the antiabrasion material has a largest surface thereof resting on the mandrel or drum 11.

Shaft 23 of drum 11 is connected with drive means for rotating this drum, comprising for example a chain 21 engaging a toothed pinion 22 mounted on shaft 23. The shaft 23 rests on a bearing 19 through rotors, with the bearing 19 being integral with a frame 20 prior to being wound on the mandrel 11, the shaped mold 5 passes between guide rollers 11 and tension rollers 17.

In FIG. 6 the mold 5 has several longitudinal grooves which, as drum 11 is wound, are filled with high-resistance filaments generally designated by the reference numeral 12 or rovings, previously impregnated with a stabilizable plastic which will not stick to the inside walls of the grooves and is capable of adhering to the filaments, 12, with the mixture of filaments 12 and stabilizable material forming the shaped body 1.

The lined mold is then covered with the strip 6 of antiabrasion material, capable of adhering to the upper surfaces of the shaped bodies 1, for example either by adhesion or by mechanical anchoring.

The antiabrasion material can be in the shape of a single strip 6 as shown in FIG. 6 or can be composed of several strips. It is also possible to use a pressure roller 14 to facilitate assembly.

A slight pull on the strip 6 can likewise insure the fitting of the strip into the mold 5 by the capstan effect.

A countermold, as described in French Patent 2,312,356 can be used before applying element 6 for a suitable distribution of the filaments in the grooves of the mold.

In FIG. 7, the mold 5 has several longitudinal grooves which as drum 11 is wound, are first each filled with an antiabrasion material which can be in the form of a strip 4 or 6, then receive high-resistance filaments 12, previously impregnated with resin which will not stick to the inside walls of the grooves, but can adhere to the filaments 12 and antiabrasion material. These resin impregnated filaments 12 are then covered with the strip 6 of antiabrasion material capable of adhering to the filaments 12.

The shaped mold 5 can be lined easily either at several points on the same generatrix of the mandrel 11 as shown in FIG. 7 or at several points on different generatrices of the mandrel 11.

In FIGS. 6 and 7, the shaped mold 5 thus filled then passes into a furnace 15 where it is subjected to heat treatment capable of conferring a stable form on the reinforced plastic material which it contains and possibly making it integral with the antiabrasion material or materials of the resin-impregnated filaments 12.

Furnace 15 is supplied with energy by any appropriate means such as, for example, cable 15a if electrical heating means are used.

In FIG. 7, reference numeral 18 designates a supply reel of shaped mold which, passing between guide rollers 16 and tension rollers 17, is filled with the filaments 12.

Following stabilization, as shown in FIGS. 6 and 7, the shaped bodies covered with antiabrasion material can be extracted from shaped mold 5 where they have been formed.

This extraction process is performed, for example, at a point located outside the mandrel 11 by curving the mold 5 using rollers 13 and 13a toward the axis of the mandrel 11.

Depending on whether the mold 5 is or is not to be continuously recycled inside or outside the mandrel 11, as shown in FIG. 6, the mold 5 can be passed into the mandrel 11 and then into the shaft 23 toward the left of the drawing and over return roller 24 (mandrel 11 and shaft 23 will both have been drilled out), or as shown in FIG. 7, the multigroove mold 5 can be caused to emerge between the groups of the shaped bodies formed and possibly recycled instead of the reel 18.

The mold 5 can then either be stored or continuously reused after passing through a mold-cleaning device 25 using a suitable means.

The released shaped bodies 1 are then transported to storage or use locations.

Figure 8:
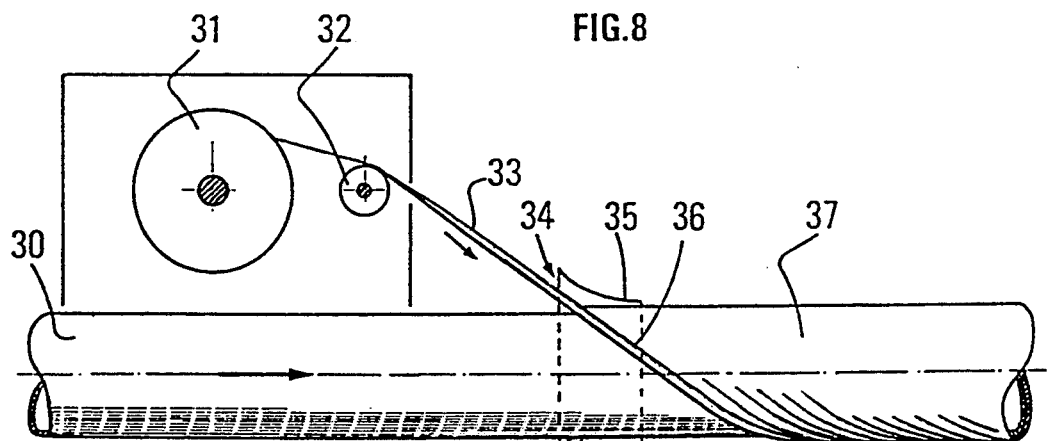
FIG. 8 is a schematic diagram of an apparatus for winding using an integral assembly according to the invention.

FIG. 8 is a schematic diagram showing the winding of a reinforcing sheet on a cylindrical body made with the abrasion-resistant shaped bodies. These shaped bodies 1 are connected together by their upper parts using a strip 6 as shown in FIGS. 3, 4 and 5 and form unit assembly 33.

This unit assembly 33 is initially stored on one or more reels 31 which may be braked, for example, by appropriate means so that the shapes are stretched before being installed.

This method of stretching the shapes can be accomplished in a different way without disadvantage.

The unit assembly 33 goes around a directional roller 32 intended to preserve the angle of application of the unit assembly 33 on the core 30.

The unit assembly 33 is then divided by cutting between the shapes before entering a die 35 and forming the applied strand 36 of the sheet 37 during application. If the application is correct without the die, 35 the latter can be removed.

The assembly can be divided, for example, by heat cutting, mechanical cutting, laser cutting, or cutting using water under pressure.

Figure 8A:
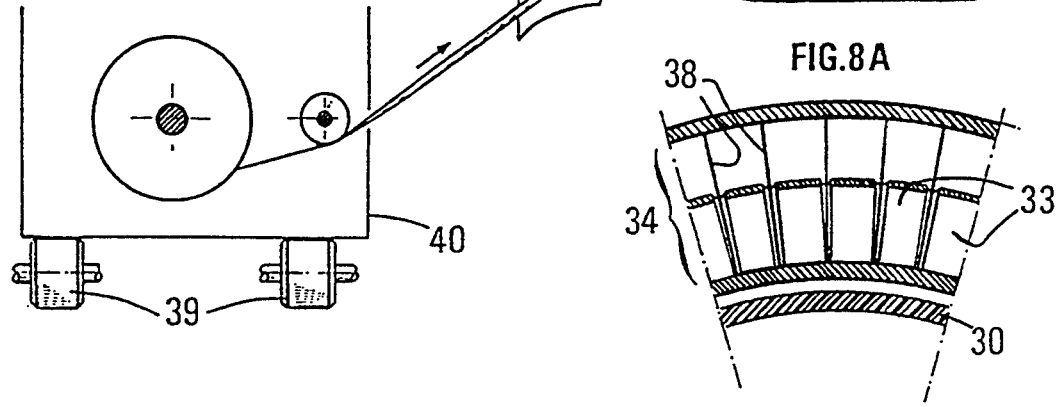
FIG. 8A is a partial cross-sectional schematic diagram of the grid used for separating and arranging the shapes used for winding reinforced tubing.

In FIG. 8, or as shown in detail in FIG. 8A, the cut may be made mechanically using separators 38 of grid 34. Grid 34 and possibly die 5 follow the rotation of the shapes around core 30. The grid 34 synchronized in rotation with a cage 40 by an appropriate means such as an interengaging device or an auxillary return shaft. The shapes passing through the grid also provide a rotational drive, and the grid 34, like the die 35, in generally translationally fixed with respect to an axis of the core 30.

The cut made in the strip can be narrow or wide depending on the configuration of the sheet and the mutual risks of stripping the antiabrasion protection off the tube shapes which touch at the level of their upper protection.

Depending on the diameter of the core 30, the angle of application, and the type of shape, it may be necessary in certain cases to cut the unit assembly 33 at right angles to each of the side faces of each of the shapes comprising the assembly.

In the method for winding a reinforcing sheet shown in FIG. 8, it is assumed that the core 30 is driven with translation toward the right of the figure and is kept from rotating while cage 40, reel support 31 and rollers 32 are immobile translation-wise but rotate around the core 30 in the direction that allows the core 30 to be covered.

All the combinations of mobility of the core 30 and the cage 40 are possible, since the relative movement of one relative to the other constitutes a threading action (to the right or left depending on the case).

In FIG. 8, the cage 40 is held by cage rollers 39. In the processes for manufacturing abrasion-resistant shaped bodies which have been discussed so far, a multigroove mold is used preferentially but it is possible to make all the shapes either one by one in a single groove and on a single mandrel or to make several at once in several molds and on a single mandrel, with the latter possibility being of interest when the effort required for removal from the mold causes unacceptable deformations of the mold.

The antiabrasion material used to provide the antiabrasion protection for the shape can be composed, for example, of thermoplastic material such as polyamide 11, thermosettable materials or elastomers properly formulated for resistance to abrasion, solid lubricants or other means of combatting wear associated with the shaped body.

It would not be beyond the scope of the present invention for the antiabrasion protection to be provided by physical or chemical treatment of the surface or surfaces of the shaped body.

If the antiabrasion protection is polyamide 11 and the shaped body is reinforced with fiberglass impregnated with epoxy resin, it is possible, for example, to use SCOTCH-WELD 2216 B/A (registered trademark of Minnesota Mining and Manufacturing Company) epoxy adhesive to join the antiabrasion protection and the shaped body.

In the case, for example, where the shaped bodies comprise two antiabrasion protections, one on the lower surface and the other on the upper surface, it is quite possible for the antiabrasion materials to be different on the two surfaces and for them to be designed so that together they produce a frictional pair of antiabrasion materials which can be put to good use when there are contacts between the internal and external reinforcing sheet.

In the description of the present invention the shapes are composed of thermosetting material reinforced with glass filaments, carbon filaments, or filaments of other materials with considerable resistance to tractive effort. It would not be going beyond the scope of the present invention to apply the proposal of the present invention by using metal reinforcing bars possessing antiabrasion qualities, for example, only on their lower and/or upper faces.

In general, the elongated bodies can include any moldable and/or stabilizable and/or reinforced material.

We claim:

1. Process for manufacturing an elongated body of reinforced material, said elongated body being capable of resisting abrasion and comprising a lower surface and an upper surface, said process comprising the steps of:
   providing a mold having an elongated groove,
   applying a first layer of antiabrasion material on at least one of an internal bottom portion and internal wall portions of said elongated groove,
   filling the elongated groove having the antiabrasion material with the reinforced material,
   applying a second layer of antiabrasion material as a covering after the step of filling the groove with reinforced material, and
   separating the reinforced material from said elongated groove after one of the step of applying of the first layer of antiabrasion material or the step of applying of the second layer of antiabrasion material whereby the elongated body is provided with at least one layer of antiabrasion material when separated from said elongated groove.

2. Process according to claim 1, wherein said reinforced material is a mixture of stabilizable plastic and high-resistance filaments, and wherein the first layer of antiabrasion material is applied prior to a stabilizing of said stabilizable plastic.

3. Process according to one of claims 1 or 2, wherein the mold has a hollow shape, further comprising the step of shaping the elongated body into a curved elongated body by disposing in a helix on a mandrel, and wherein when said elongated curved body p(1) comprising] having at least one layer of antiabrasion material has been shaped, the curved elongated body is separated from said mold.

4. A process according to one of claims 1 or 2, wherein the mold is provided with a plurality of substantially parallel grooves for permitting a production of a plurality of elongated bodies capable of resisting abrasion.

5. Process according to one of claims 1 or 2, wherein the step of applying the first and second layers of antiabrasion material includes laying a strip of antiabrasion material in the elongated groove.

6. Process according to claim 4, wherein all upper surfaces of said elongated bodies are covered simultaneously to protect the upper surfaces from abrasion, using a single strip of antiabrasion material.

7. Process according to claim 6, wherein said strip comprises a restriction zone between adjacent elongated bodies.

8. Process according to claim 7, further comprising the step of dividing the strip between adjacent elongated bodies after having separated the elongated bodies from the mold to simultaneously produce several shaped elongated bodies which are abrasion-resistant.

9. Process according to claim 6, wherein the elongated bodies are separated from one another during a use of the elongated body such that said elongated body comprises a plurality of said elongated bodies.

10. An elongated body obtained by the process according to one of claims 1 or 2.

11. Curved elongated body comprising an upper surface, a lower surface, and a pair of spaced lateral surfaces disposed between said upper and lower surfaces, means for resisting abrasion provided on at least one of the upper surface and the lower surface, and wherein means for resisting abrasion are provided on only one portion of at least one of the lateral surfaces.

* * * * *